US012645917B2

(12) United States Patent
Naphade et al.

(10) Patent No.: US 12,645,917 B2
(45) Date of Patent: Jun. 2, 2026

(54) NEURAL ARCHITECTURE FOR SELF SUPERVISED EVENT LEARNING AND ANOMALY DETECTION

(71) Applicant: NVIDIA Corporation, Santa Clara, CA (US)

(72) Inventors: Milind Naphade, Cupertino, CA (US); Tingting Huang, Santa Clara, CA (US); Shuo Wang, Santa Clara, CA (US); Xiaodong Yang, Fremont, CA (US); Ming-Yu Liu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 486 days.

(21) Appl. No.: 16/453,913

(22) Filed: Jun. 26, 2019

(65) Prior Publication Data

US 2020/0410322 A1 Dec. 31, 2020

(51) Int. Cl.

| | |
|---|---|
| ***G06F 7/57*** | (2006.01) |
| ***G06N 3/045*** | (2023.01) |
| ***G06N 3/047*** | (2023.01) |
| ***G06N 3/088*** | (2023.01) |

(52) U.S. Cl.

CPC ............... *G06N 3/045* (2023.01); *G06F 7/57* (2013.01); *G06N 3/047* (2023.01); *G06N 3/088* (2013.01)

(58) Field of Classification Search

CPC ......... G06N 3/0472; G06N 3/088; G06F 7/57

See application file for complete search history.

(56) References Cited

U.S. PATENT DOCUMENTS

| | | | |
|---|---|---|---|
| 10,719,706 B1 * | 7/2020 | Nicotera | ................ G06V 10/82 |
| 2017/0309292 A1 * | 10/2017 | Eddington, Jr. | .... G10L 21/0208 |
| 2018/0165554 A1 | 6/2018 | Zhang et al. | |
| 2018/0219895 A1 | 8/2018 | Silver et al. | |

FOREIGN PATENT DOCUMENTS

| | | |
|---|---|---|
| CN | 106295503 A | 1/2017 |
| CN | 108805283 A | 11/2018 |
| CN | 109522828 A | 3/2019 |
| CN | 109885918 A | 6/2019 |
| CN | 110046537 A | 7/2019 |

OTHER PUBLICATIONS

Reza Asadi, & Amelia Regan. (2019). A convolution recurrent autoencoder for spatio-temporal missing data imputation. (Year: 2019).*

(Continued)

*Primary Examiner* — Kakali Chaki
*Assistant Examiner* — Johnathan R Germick
(74) *Attorney, Agent, or Firm* — Davis Wright Tremaine LLP

(57) ABSTRACT

Systems and methods that use at least one neural network to infer content of individual frames in a sequence of images and to further infer changes to content in sequence of images over time to determine whether one or more anomalous events are present in sequence of images is described herein.

26 Claims, 10 Drawing Sheets

(56) References Cited

OTHER PUBLICATIONS

M. Sabokrou, M. Fathy, M. Hoseini and R. Klette, "Real-time anomaly detection and localization in crowded scenes," 2015 IEEE Conference on Computer Vision and Pattern Recognition Workshops (CVPRW), 2015, pp. 56-62, doi: 10.1109/CVPRW.2015.7301284. (Year: 2015).*
Bo Zong, Qi Song, Martin Renqiang Min, Wei Cheng, Cristian Lumezanu, Daeki Cho, & Haifeng Chen (2018). Deep Autoencoding Gaussian Mixture Model for Unsupervised Anomaly Detection. In International Conference on Learning Representations. (Year: 2018).*
Viorica Patraucean, Ankur Handa, & Roberto Cipolla (2015). Spatio-temporal video autoencoder with differentiable memory. CoRR, abs/1511.06309. pg 1-13 (Year: 2015).*
Huihui Zhu, Bin Liu, Guojun Yin, Yan Lu, Weihai Li, & Nenghai Yu. (2018). Real-Time Anomaly Detection With HMOF Feature. (Year: 2018).*
B. Yang, J. Cao, N. Wang and X. Liu, "Anomalous Behaviors Detection in Moving Crowds Based on a Weighted Convolutional Autoencoder-Long Short-Term Memory Network," in IEEE Transactions on Cognitive and Developmental Systems, IEEE Xplore, Aug. 23, 2018, doi: 10.1109/TCDS.2018.2866838. (Year: 2018).*
Liu, W., Luo, W., Lian, D., & Gao, S. (2018). Future Frame Prediction for Anomaly Detection—A New Baseline. In Proceedings of the IEEE Conference on Computer Vision and Pattern Recognition (CVPR). (Year: 2018).*
Shiyang Yan, Jeremy S. Smith, Wenjin Lu, & Bailing Zhang (2015). Abnormal Event Detection From Videos Using a Two-Stream Recurrent Variational Autoencoder. Journal of Latex Class files vol. 14 No. 8 Aug. 2015 (Year: 2015).*
Chong et al. "Abnormal Event Detection in Videos using Spatiotemporal Autoencoder," Jan. 6, 2017, 20 pages.
Extended European Search Report mailed Nov. 25, 2020, for European Patent Application No. 20177069.0, 12 pages.
GMM "Gaussian Mixture Model," retrieved from the Internet on May 3, 2021, https://scikit-learn.org/stable/modules/mixture.html, 2007, 5 pages.
Huang et al., "Traffic System Anomaly Detection using Spatiotemporal Pattern Networks," Iowa State University, 2017, 14 pages.
Kiran et al., "An Overview of Deep Learning Based Methods for Unsupervised and Semi-Supervised Anomaly Detection in Videos," Jan. 9, 2018, 14 pages.
Liu et al., "Future Frame Prediction for Anomaly Detection—A New Baseline," IEEE/CVF Conference on Computer Vision and Pattern Recognition, IEEE, Jun. 18, 2018, pp. 6536-6545.
Liu et al., "An Unsupervised Spatiotemporal Graphical Modeling Approach to Anomaly Detection in Distributed CPS," ICCPS, 2016, 10 pages.
Madiraju et al. "Deep Temporal Clustering: Fully Unsupervised Learning of Time-Domain Features," Feb. 4, 2018, 11 pages.
Medel et al., "Anomaly Detection in Video Using Predictive Concolutional Short-term Memory Networks," Dec. 15, 2016, 27 pages.
Meena et al., "Detecting Abnormal Event in Traffic Scences using Unsupervised Deep Learning Approach," International Conference on Wireless Communications Signal Processing and Networking, IEEE, Mar. 21, 2019, pp. 355-362.
Sultani et al., "Real-world Anomaly Detection in Surveillance Videos," CVPR, 2018, 10 pages.
Tran et al., "Learning Spatiotemporal Features with 3D Convolutional Networks," ICCV, 2015, 9 pages.
Wang et al., "Abnormal Event Detection in Videos Using Hybrid Spatio-Temporal Autoencoder," 25th IEEE International Conference on Image Processing, Oct. 7, 2018, 6 pages.
Zong et al., "Deep Autoencoding Gaussian Mixture Model for Unsupervised Anomaly Detection," ICLR, 2018, 19 pages.
IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.
Office Action for Chinese Application No. 202010568819.3, mailed Apr. 28, 2023, 20 pages.
Office Action for Chinese Application No. 202010568819.3, mailed Oct. 12, 2023, 14 pages.
Office Action for European Application No. 20177069.0, mailed Dec. 23, 2024, 12 pages.
Zhu et al., "Real-time Anomaly Detection with HMOF Feature," Dec. 2018, 6 pages.
Office Action for Chinese Application No. 202010568819.3, mailed Jan. 30, 2024, 5 pages.

* cited by examiner

500

Receive Video Data From One Or More Cameras — 502

Use A Convolutional Autoencoder To Generate Latent Representations Of The Video Data — 504

Use A Long Short-Term Memory (LSTM) Extract Features From The Latent Representations Provided By The Convolutional Autoencdoer — 506

Use A Gaussian Mixture Model (GMM) To Generate Likelihood Scores For The Video Data — 508

Anomaly? — 510

Yes

Anomaly Indicator — 512

No

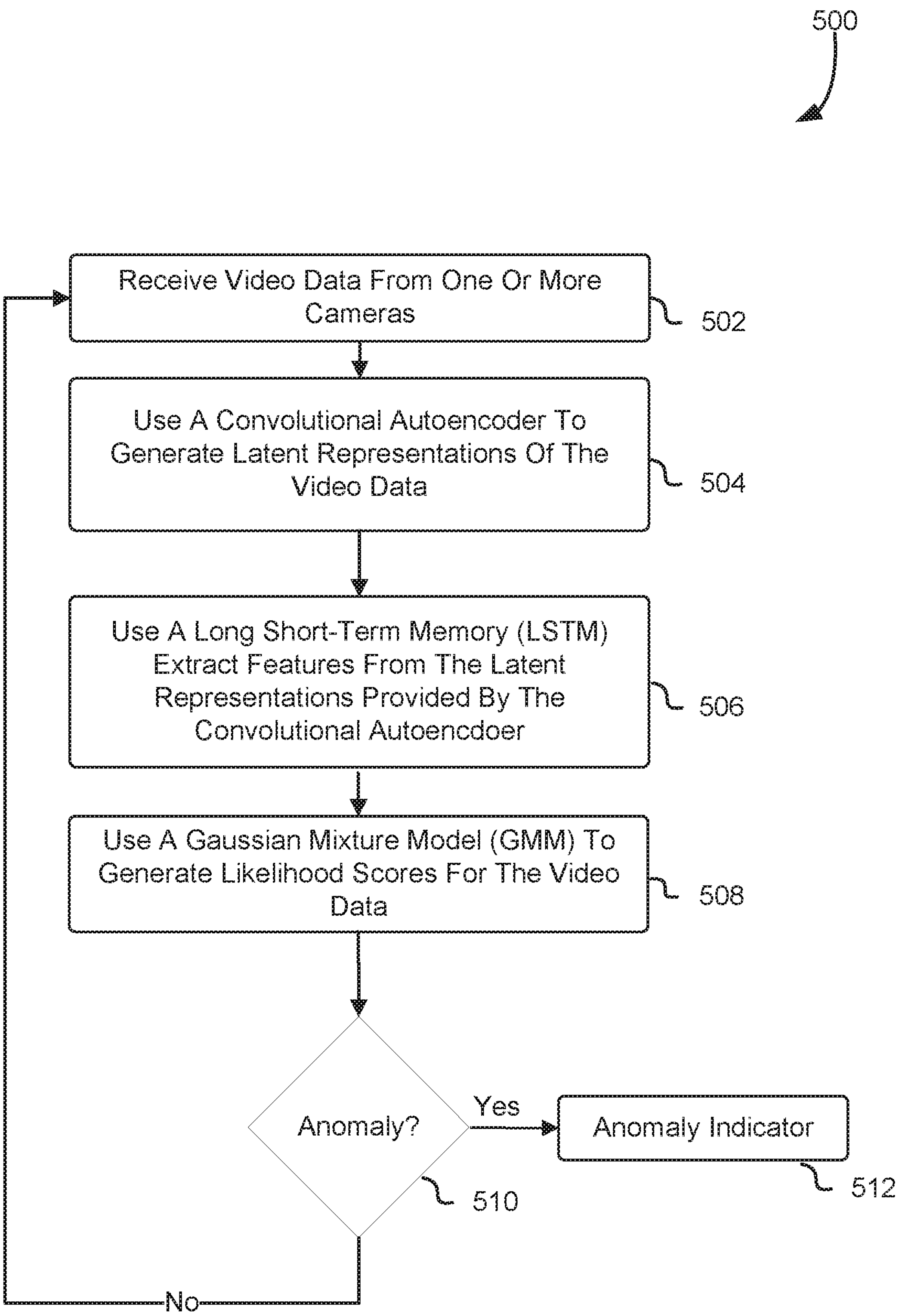

FIG. 5

Streaming Multiprocessor 900

Instruction Cache
902

Scheduler Unit (K)904

Dispatch
906

Register File
908

Core
(L-1)
910

SFU
(M-1)
912

LSU
(N-1)
914

Interconnect Network
916

Shared Memory/L1 Cache
918

NEURAL ARCHITECTURE FOR SELF SUPERVISED EVENT LEARNING AND ANOMALY DETECTION

BACKGROUND

There are various technical challenges involved in being able to scale training a neural network for a large number of events identified from video data. As video data obtained from cameras get bigger, tracking and supervision of events and/or objects detected in video data become more complex and are prone to errors. In other words, as video data get bigger, more computing resources are required to continuously supervise and track event and/or objects accurately. That is, event and/or object detection requires supervision and computing resources required to parse and track each and every event and/or object from video data typically exceed or otherwise overwhelm what a computing environment with limited resources can handle.

BRIEF DESCRIPTION OF DRAWINGS

Various techniques will be described with reference to drawings, in which:

FIG. 5 is an illustrative example of a process 500 for detecting one or more anomalous events in a sequence of images, in accordance with an embodiment;

DETAILED DESCRIPTION

Figure 1:
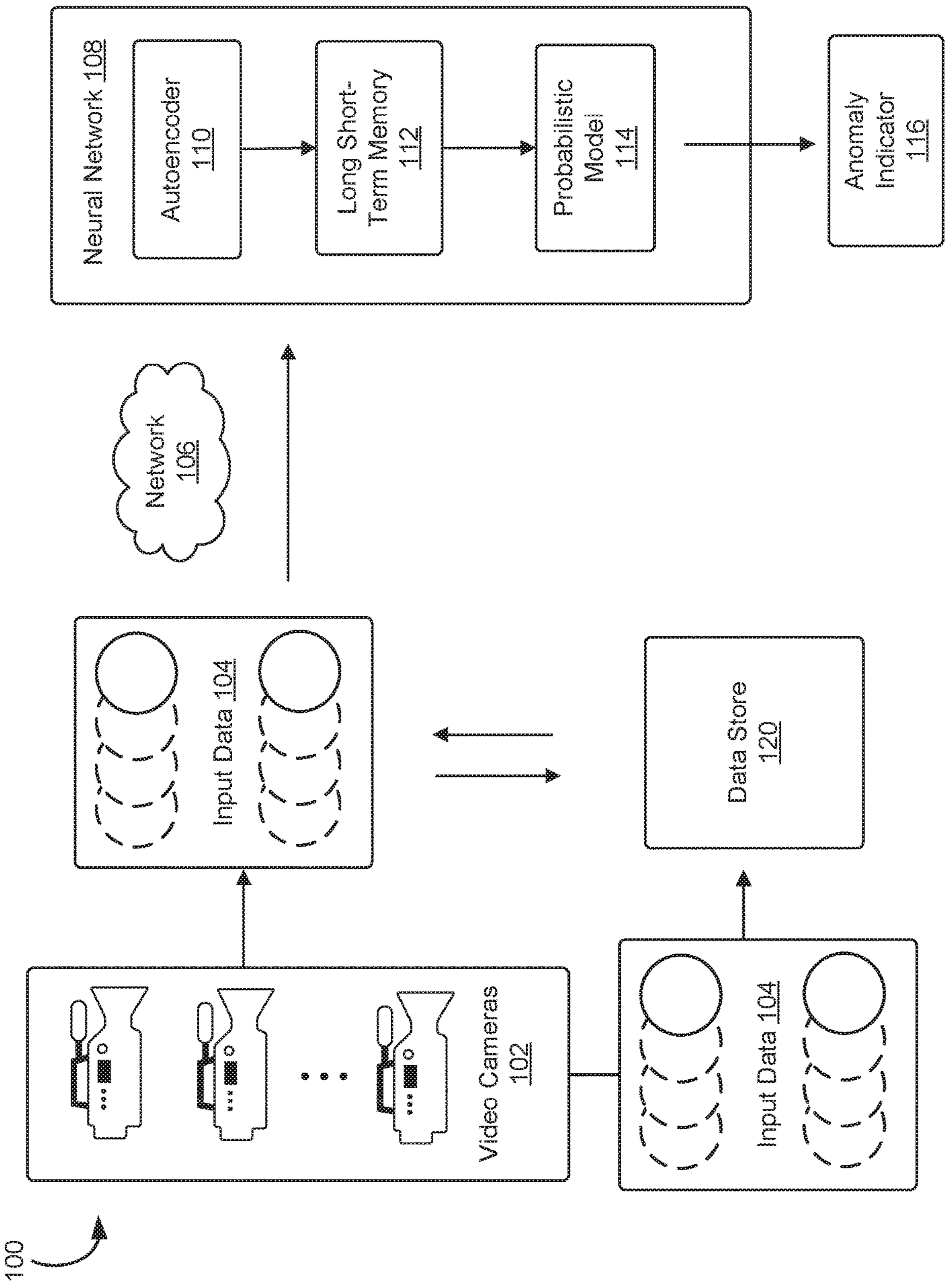
FIG. 1 illustrates a computing environment in which a neural architecture is implemented to detect one or more anomalous events, in accordance with an embodiment.

In at least one embodiment, systems and methods implemented in accordance with this disclosure are utilized to create an end-to-end neural architecture (e.g., neural network) that simultaneously combines self-supervision, modeling temporal dynamics of a sequence of images, and an ability to learn normal event behavior all in one network. In at least one embodiment, a neural network combines self-supervision of deep autoencoders with latent space modeling of Gaussian mixtures and temporal dynamic modeling of recurrent networks. In at least one embodiment, at least one neural network uses both spatial information from frames in a video (content of individual frames) and temporal information (how frames change over time) to determine whether an anomalous event is present in a set of images of a video.

In at least one embodiment, at least one neural network is trained by using an optical flow of video frames (e.g., sequence of images in video data) that are fed as input into an autoencoder to encode video frames. In at least one embodiment, an autoencoder extracts information from individual frames. In at least one embodiment, an autoencoder is a convolutional autoencoder. In at least one embodiment, results provided by autoencoder are then fed into a Long Short-Term Memory (LSTM) network, which is designed to make inferences from series of data by extracting features from how frames change over time. In accordance with an embodiment, encoded video data is decoded and reconstructed back to video data and errors associated with reconstruction is measured. In at least one embodiment, reconstruction error measurements along with features extracted from how frames change over time are fed to a probabilistic model. In at least one embodiment, a probabilistic model is a Gaussian Mixture Model (GMM) that minimizes reconstruction errors and trained to maximize a likelihood such that information (e.g., scores) are generated to indicate a high likelihood of normal event behavior. Once at least one neural network is trained using optical flow of video frames, new sequence of frames or additional video frames from cameras are processed through a trained at least one neural network. In at least one embodiment, neural network includes autoencoder, LSTM, and an probabilistic model, where probabilistic model then outputs a likelihood of whether new sequence or incoming video frames show an anomaly. In at least one embodiment, autoencoder, LSTM, and probabilistic model are a part of multiple layers in a single neural network that is trained to perform each function as described above. In at least one embodiment, autoencoder, LSTM, and probabilistic model are a part of multiple layers in a network of a plurality of individual neural networks.

Techniques described herein are utilized to implement a neural network that is self-supervised to discover frequent event patterns obtained from a sequence of images captured by multiple static (e.g., stationary) video cameras and further trained to detect rare event patterns including anomalies in a sequence of images. In at least one embodiment, there are millions of cameras that exist worldwide and most of its content is uninteresting to watch; however, in some instances, there may be a need to detect and locate rare, infrequent, and/or anomalous patterns from all of this content without having to reconfigure static video cameras. To detect these rare event (e.g., anomalous) patterns, it would be very complex to build supervised models for each and every event of interest. That is, detecting objects/events in a sequence of images using bounding boxes and adding manual rules for tracking, adding temporal learning to bounding boxes, and/or using traditional supervised approaches all have their shortcomings. For instance, object detection ignores complex object-object temporal interactions and assumes perfect detection and tracking. Moreover, a supervised approach delivers low performance due to lack of sufficient training samples. Hence, creating a neural network that is trained using events captured by video cameras and further configuring a neural network to have self-supervised learning capabilities that is free of tracking information for anomaly detection may be advantageous.

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

FIG. 1 illustrates a computing environment 100 in which a neural architecture is implemented to detect one or more anomalous events, in accordance with an embodiment. In at least one embodiment, computing environment 100 comprises a plurality of video cameras 102 that are a part of network of cameras used to record and capture video (e.g., sequence of images). In at least one embodiment, video cameras 102 are traffic cameras, surveillance cameras, home security cameras, digital cameras, etc. In at least one embodiment, plurality of video cameras 102 record video data, where video data is representative of a stream or a sequence of images captured over a period of time. In at least one embodiment, video data (e.g., a sequence of images) is referred to as input data 104. In at least one embodiment, input data 104 is sent from plurality of video cameras 102 to a data store 118 for storage. In at least one embodiment, formats of input data 104 include .mp4, .wmv, .avi, .fly, etc. In at least one embodiment, formats of input data 104 includes sequence of images in .JPEG, .GIF, .BMP, .PNG, etc. In at least one embodiment, video cameras 102 are surveillance cameras that record and feeds traffic images as input data 104 to a neural network 108. In at least one embodiment, video cameras 102 as described herein includes more than one video camera. In accordance with an embodiment, video cameras 102 is just a single video camera that records video data.

As further shown in FIG. 1, in at least one embodiment, computing environment 100 includes a data store 120 that receives input data 104 from one or more video cameras 102. In at least one embodiment, data store 120 is configured to store video data (e.g., sequence of images), text, metadata, training data, training images, training data threads, etc. In at least one embodiment, data store 120 is a data storage device, a data storage service in connection with a computing device (not depicted in FIG. 1), buffer, or a message queue. In at least one embodiment, input data 104 is a collection of training images that are three-dimensional (3-D), and when obtained by one or more neural networks, is used to train one or more neural networks for anomaly detection in additional or new video frames that are fed to a trained network. In at least one embodiment, input data 104 is audio data, such that when obtained by one or more neural networks, audio data is used to train none or more neural networks for speech recognition or speech anomaly detection purposes. In at least one embodiment, input data 104 is stored as a data structure such as an array or a matrix. In at least one embodiment, data store 120 is configured to satisfy requests for input data 104 by sending input data 104, via a network 106, either through a wired or wireless network, to a neural network 108. In at least one embodiment, neural network 108 is also referred to as a deep network or simply a network as described herein.

In at least one embodiment, neural network 108 is a computing device, a Graphics Processing Unit (GPU) or, in at least one embodiment, representative of multiple computing devices that comprise multiple GPUs. In at least one embodiment, neural network 108 is configured to receive input data 104 to detect anomalous events from input data 104. In at least one embodiment, input data 104 is received at neural network 108 from data store 120, another computing device, computing service, virtual machine, virtual service (not depicted in FIG. 1) outside or inside of computing environment 100, via network 106.

In at least one embodiment, neural network 108 comprises at least an autoencoder 110, a Long Short-Term Memory (LSTM) 112, and a probabilistic model 114. In at least one embodiment, neural network 108 may be one single network where components, layers, or portions of network each comprise of autoencoder 110, LSTM 112, and probabilistic model 114. In at least one embodiment, neural network is comprised of multiple neural networks and each component of multiple neural networks comprise of autoencoder 110, LSTM 112, and probabilistic model 114. In at least one embodiment, neural network 108 is comprised of a plurality of neural networks where autoencoder 110 is a first neural network, LSTM 112 is a second neural network, and probabilistic model 114 is a third neural network, where all three neural networks are separate from one another.

In at least one embodiment, autoencoder 110 receives input data 104 via network 106. As described above, input data 104 may be video data/sequence of images obtained from a plurality of video cameras 102. In at least one embodiment, autoencoder 110 is a type of neural network designed to learn and apply data encoding in an unsupervised manner. In other words, in at least one embodiment, autoencoder 110 learns to generate a representation (e.g., encoding) for a set of data. In at least one embodiment, autoencoder 110 takes input data 104 as its input to infer content from individual images in a sequence of images. In at least one embodiment, content includes spatial information from individual images. In at least one embodiment, autoencoder 110 is a component (e.g., layer) of neural network 108. In at least one embodiment, autoencoder 110 makes inferences about objects in frames from input data 104 (e.g., whether a car is shown in several frames). In at least one embodiment, autoencoder 110, in itself a neural network, has three internal layers: an input layer, a hidden (encoding) layer, and a decoding layer where network is trained to reconstruct its input. In at least one embodiment, autoencoder 110 maps input data 104 to generate one or more latent representations in a feature space from which input data 104 can be approximately reproduced from features in a reduced feature space. That is, in at least one embodiment, autoencoder 110 is used to extract features that represent input data 104 in terms of reconstruction. In at least one embodiment, autoencoder 110 is a convolutional autoencoder. In at least one embodiment, instead of using a convolutional autoencoder, a fully connected autoencoder is used.

In at least one embodiment, LSTM 112 receives results from autoencoder 110. In at least one embodiment, LSTM 112 is a component (e.g., layer) of neural network 108 and results from autoencoder 110 are fed to LSTM 112 such that LSTM 112 makes inferences from series of data. In at least one embodiment, LSTM 112 is a recurrent network that processes data to generate information about data. That is, in at least one embodiment, LSTM 112 is a recurrent network that learns how individual frames change over time and extracts features from how these frames change from frame-to-frame. In at least one embodiment, individual frames are analyzed using previously trained frames. In other words, in at least one embodiment, LSTM 112 extracts features from previous frames that are remembered (e.g., previously trained on) and combines that with a new incoming frame to infer changes in content in new incoming frame that is a part of input data 104. As an example, new incoming frame is combined with previous frames using a sliding scale approach to infer changes in new incoming frame. That is, in at least one embodiment, new incoming frame is combined with a total of 10 seconds of frames previously before new incoming frame to infer changes in content of new incoming frame. In another example, new incoming frame is combined with a total of 11 seconds of frames previously before new incoming frame to infer changes in content of new incoming frame. In at least one embodiment, a sliding scale approach is performed until a predetermined amount of seconds (e.g., total of 30 seconds) has been met. In at least one embodiment, changes in content includes temporal information about input data 104. That is, in at least one embodiment, results from autoencoder 110 is sent to LSTM 112 to make inferences about what objects in input data 104 are doing in optical flow of frames (e.g., determining from frame-to-frame of whether a car is travelling in a particular lane/direction).

In at least one embodiment, probabilistic model 114 receives information from LSTM 112. In at least one embodiment, probabilistic model 114 is a Gaussian Mixture Model (GMM) that is a component (e.g. layer) of neural network 108. In at least one embodiment, probabilistic model 114 incorporates random variables and probability distributions into a model of an event. In at least one embodiment, a GMM is a probabilistic model that assumes all data points are generated from a mixture of a finite number of Gaussian distributions. In at least one embodiment, probabilistic model 114 (e.g., GMM) is modeling a combination of features from latent space and information from reconstruction error measurements generated from reconstructing input data 104. In at least one embodiment, reconstruction error measurements are calculated using relative Euclidean distance, cosine similarity, and/or Euclidean distance between reconstructed input data and input data 104. In at least one embodiment, probabilistic model 114, when trained, estimates a distribution of normal data.

In at least one embodiment, with respect to using a trained probabilistic model 114 for anomaly detection, an assumption is all normal data are from some distribution (e.g., previously trained model) and an anomaly will fall out of that distribution. In at least one embodiment, probabilistic model 114 provides a notification or indication of an anomaly 116 in input data 104 because, from being trained, probabilistic model 114 has learned which events are considered anomalous (e.g., different from normal data). In at least one embodiment, probabilistic model 114 generates an anomaly indicator 116 to indicate a likelihood of an anomalous event.

In at least one embodiment, an anomaly indicator 116 results from probabilistic model 114 when an anomaly event is identified. In at least one embodiment, anomaly indicator 116 includes information about data different from normal data (e.g., anomaly event) from input data 104. In at least one embodiment, anomaly indicator 116 is a message sent to a user with information indicating a likelihood of which event from a plurality of events of input data 104 is observed to be anomalous. In at least one embodiment, a likelihood is a value outside normal distribution (using values probabilistic model was previously trained on), it would indicate that it is an anomaly event. In at least one embodiment, a value is lower than a threshold given that probabilistic model, when previously trained, indicates that normal events or behavior have high likelihood scores (or scores above a certain threshold). In at least one embodiment, anomaly indicator 116 identifies individual frames from a sequence of images and tags them with metadata to indicate a likelihood of an anomalous event and updates a Graphical User Interface (GUI) to indicate as such.

Figure 2:
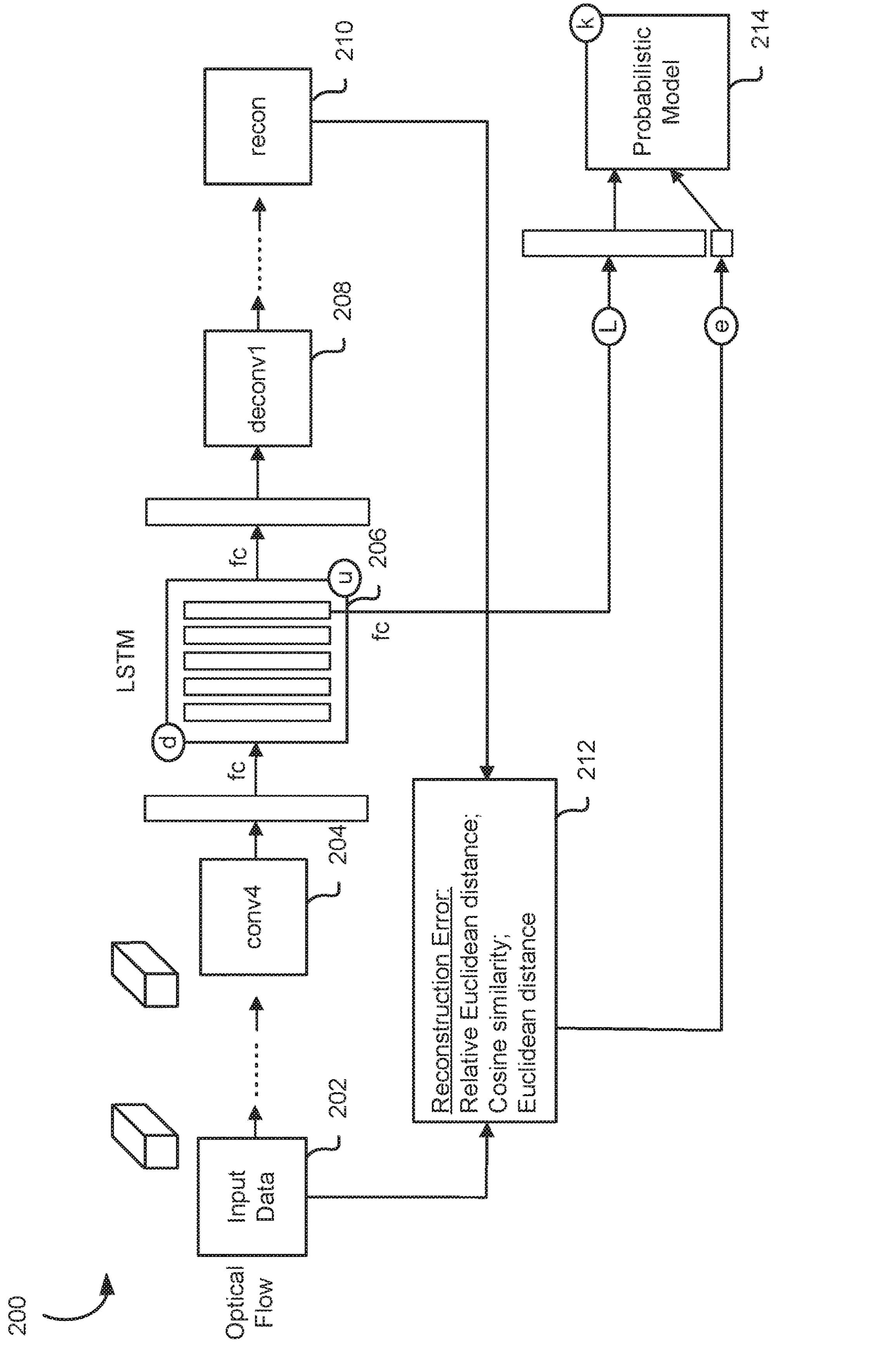
FIG. 2 illustrates an environment in which a neural architecture is implemented to detect one or more anomalous events using at least an autoencoder, Long Short-Term Memory (LSTM), and a probabilistic model in accordance with an embodiment.

FIG. 2 illustrates an environment in which a neural architecture (e.g., neural network) 200 is implemented to detect one or more anomalous events from input data 202 using an autoencoder 204, Long Short-Term Memory (LSTM) 206, and a probabilistic model 214 in accordance with an embodiment. In at least one embodiment, input data 202 is video data (e.g., sequence of images) obtained from one or more cameras.

In at least one embodiment, neural network 200 includes a convolutional autoencoder 204, which is a layer in neural network 200, that is designed to generate one or more latent representations (e.g., low dimensional representation) of input data 202 in a feature space. In at least one embodiment, latent representations are representations of input data 202 that lie in latent space. In at least one embodiment, convolutional autoencoder 204 is replaced by a fully connected conventional encoder. In at least one embodiment, input data 202 is received by convolutional autoencoder 204 as input, and convolutional autoencoder 204 encodes input data 202 to generate encoded data input, which can be decoded by a decoder 208 to regenerate original input data 202. In at least one embodiment, by encoding input data 202, convolutional autoencoder 204 infers content from individual images of input data 202. In at least one embodiment, content from individual frames from a sequence of images is inferred by convolutional autoencoder 204 and further fed to a LSTM 206. In at least one embodiment, content includes spatial information about individual frames.

In at least one embodiment, an LSTM 206 receives one or more latent representations of input data 202 from convolutional autoencoder 204. In at least one embodiment, neural network 200 includes LSTM 206, which is a layer of its network, designed to make inferences from series of data (e.g., a sequence of images). In at least one embodiment, LSTM 206 extracts features from how frames/images of sequence of images change over time. In at least one embodiment, LSTM 206 infers changes in content in input data 202. In at least one embodiment, changes in content includes temporal information about input data 202. In at least one embodiment, results from convolutional autoencoder 204 is sent to LSTM 206 to make inferences about what objects in input data 202 are doing from frame-to-frame.

In at least one embodiment, a decoder 208 for convolutional autoencoder 204 is used by neural network to reconstruct 210 one or more latent representations of input data 202 resulting from convolutional autoencoder 204. In at least one embodiment, reconstruction error 212 for each input data point is measured. In at least one embodiment, reconstruction error measurements 212 is determined by at least calculating relative Euclidean distance, Cosine similarity, or Euclidian distance between each data points in reconstructed input data and input data 202. In at least one embodiment, reconstruction error measurements 212 is fed along with results from LSTM 206, when training neural network, to a probabilistic model 214. In at least one embodiment, measuring reconstruction errors are not necessary for inferring changes in frames to detect anomalous events.

In at least one embodiment, a probabilistic model (e.g., Gaussian Mixture Model (GMM)) 214 is leveraged with neural network 200 to determine whether one or more anomaly events exists in input data 202. In at least one embodiment, probabilistic model is a layer in neural network 200 that is used in connection with other layers of network 200. In at least one embodiment, data points generated by a GMM are derived from a mixture of Gaussian distributions that has no known parameters. In at least one embodiment, parameters for GMMs are derived either from maximum a posteriori estimation or an iterative expectation-maximization algorithm from a prior model that was trained. In other words, in at least one embodiment, probabilistic model 214, such as GMM, is previously trained or pre-trained using training video data indicative of normal behavior. In at least one embodiment, probabilistic model 214 is previously trained using video data indicating that cars are driving one direction only (e.g., from East to West). In at least one embodiment, using inferences about what objects in input are dong from frame-to-frame obtained from additional or new optical flow of video frames, probabilistic model 214 generates an anomaly notification for an event if a car is found to be traveling in opposite direction (e.g., from West to East) of what model is trained to believe to be normal behavior.

Figure 3:
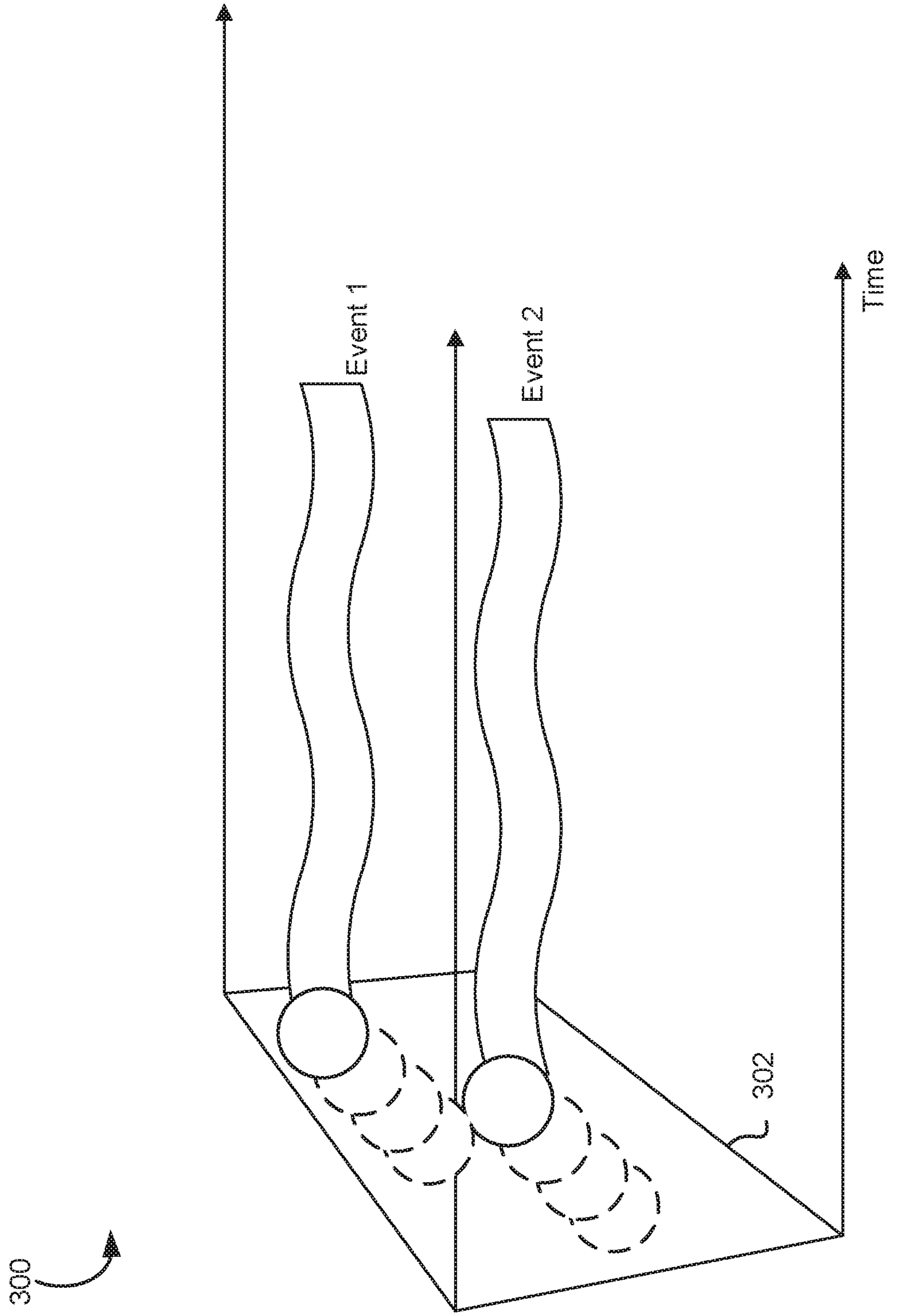
FIG. 3 illustrates a diagram of event tracking in a spatial-temporal space, in accordance with an embodiment.

FIG. 3 illustrates a diagram 300 of event tracking in spatial-temporal space, in accordance with an embodiment. In at least one embodiment, in video spatial-temporal space, bounding boxes of annotated anomalous objects 302 form as three-dimensional (3-D) volumes. In at least one embodiment, each volume is treated as an event and, using neural network implemented as described in FIGS. 1-2, volumes from those features are detected to determine whether they are anomalous. In other words, in at least one embodiment, at least one neural network uses both spatial information from frames in a video (content of individual frames) and temporal information (how frames change over time) to determine whether an anomalous event is present in video based on previously trained models.

In at least one embodiment, a detected event is considered for evaluation if its detected duration is greater than 10 frames (1 second) in a sequence of images. In at least one embodiment, a ground truth event is one object or object group that has anomalous behavior, marked in spatial and temporal space. In at least one embodiment, an accurately detected event is an event that is considered accurately detected if its temporal Intersection over Union (IoU) with ground truth exceeds 50% of detected duration. In at least one embodiment, a recalled event is one or more detected events for same ground truth event that will be considered as a single recalled event. examples of calculation for precision and recall of events detected from a sequence of images is shown below:

$$\text{Precision Event} = \frac{\#\ \text{Accurately Detected Events}}{\#\ \text{Detected Events}}$$

$$\text{Recall Event} = \frac{\#\ \text{Recalled Events}}{\#\ \text{Ground Truth Events}}$$

Figure 4:
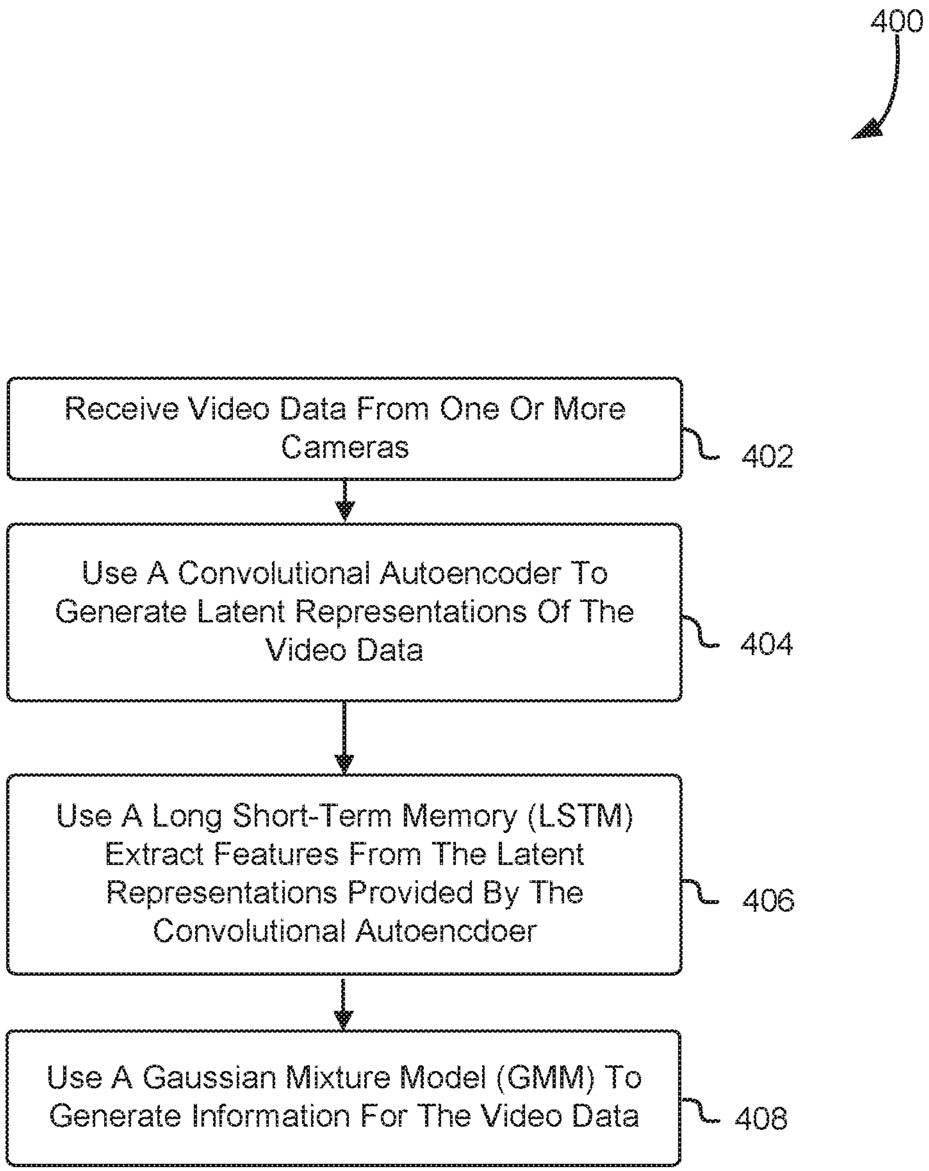
FIG. 4 is an illustrative example of a process for training at least one neural network to determine one or more anomalous events in a sequence of images, in accordance with an embodiment.

FIG. 4 is an illustrative example of a process 400 for training at least one neural network to determine one or more anomalous events in a sequence of images, in accordance with an embodiment. In accordance with an embodiment, video data is received by at least one neural network from one or more cameras 402. In at least one embodiment, one or more cameras comprises traffic cameras at an interaction where individual frames are captured indicating normal traffic flow at intersection. In at least one embodiment, one or more video cameras comprise of traffic cameras or surveillance camera that continuously record video data/sequence of images of a freeway, highway, pedestrian walkway, and like. In at least one embodiment, individual frames (e.g., individual images) from a sequence of frames (e.g., sequence of images) are then fed from one or more cameras to an encoder such as a convolutional autoencoder. In at least one embodiment, at least one neural network includes a convolutional autoencoder that is configured to use individual frames and generate latent representations of frames 402. In accordance with an embodiment, at least one neural network is used to infer content from individual images in a sequence of images obtained by one or more traffic cameras at intersection. A sequence of images may be fed to at least one neural network where at least one neural network is trained.

In at least one embodiment, FIG. 4 further describes use of a Long Short-Term Memory (LSTM) to train at least one neural network, where LSTM is configured to extract features from latent representations provided by convolutional autoencoder 406. In at least one embodiment, at least one neural network uses LSTM to infer changes in content in a sequence of images. As described in connection with FIGS. 1-2, in at least one embodiment, results from convolutional autoencoder are fed to a LSTM such that LSTM infers changes in content in sequence of images. In at least one embodiment, LSTM is designed to make inference from series of data (e.g., extracts features from how frames change over time). In at least one embodiment, LSTM is a separate layer of neural network from autoencoder but still a part of same neural network. In at least one embodiment, results from LSTM and reconstruction error measurements when reconstructing images are then fed into a probabilistic model (e.g., Gaussian Mixture Model) to train GMM. In at least one embodiment, a decoder is fed with input data, such as sequence of images, to train GMM and further providing input data with information about images to configure GMM 408. In at least one embodiment, GMM is trained such that frames in sequence of images received from one or more cameras are associated with information (e.g., metadata, tags) based at least in part on changes inferred by LSTM in content in sequence of images. In at least one embodiment, at least one neural network is trained by associating and/or providing metadata indicating that each of frames in video data processed are considered normal behavior.

FIG. 5 is an illustrative example of a process 500 for detecting one or more anomalous events in a sequence of images, in accordance with an embodiment. In at least one embodiment, process 500 utilizes trained neural network as described in FIG. 4 to detect one or more anomalous events in a sequence of images that are captured by one or more cameras. In at least one embodiment and as described in connection with FIG. 4, video data is received by at least one neural network from one or more cameras 502. In at least one embodiment, one or more cameras comprises traffic cameras, surveillance cameras, digital cameras, etc. In at least one embodiment, individual frames from video data are then fed to a autoencoder such as a convolutional autoencoder. In at least one embodiment, at least one neural network includes a convolutional autoencoder that is configured to use individual frames and generate latent representations of frames 502. In accordance with an embodiment, at least one neural network is used to infer content from individual frames (e.g. individual images) in a sequence of frames (e.g., sequence of images) obtained by one or more traffic cameras.

In at least one embodiment, FIG. 5 further describes using a Long Short-Term Memory (LSTM) to train at least one neural network, where LSTM is configured to extract features from latent representations provided by convolutional autoencoder 506. In at least one embodiment, at least one neural network uses LSTM to infer changes in content in sequence of images. In at least one embodiment, LSTM is designed to make inference from series of data (e.g., extracts features from how frames change over time). In at least one embodiment, results from LSTM are then fed into a probabilistic model (e.g., Gaussian Mixture Model) to result in likelihood (e.g., probability) scores for sequence of images 508. In at least one embodiment, GMM, based on its previous training, identifies frames in video data received from one or more cameras that are anomalous. In at least one embodiment, GMM generates likelihood scores based at least in part on information from changes inferred by LSTM in content in sequence of images. In at least one embodiment, likelihood scores are indicative of whether an anomaly exists 510. In at least one embodiment, if an anomaly is detected, an anomaly indicator is sent to a user or to a separate computing system 512. In at least one embodiment, GMM outputs an anomaly indicator 512 with a message that allows a user to identify which event or events have been deemed as anomalous (e.g., data that is different than normal data). In at least one embodiment, an anomaly indicator is a message generated and transmitted to a user associated with a separate computing device. In at least one embodiment, a graphical user interface (GUI) is updated to display an anomaly indicator message. In at least one embodiment, if likelihood scores associated with an anomaly event is outside normal distribution that was determined when GMM was previously trained using a collection of images then no anomaly indicator is generated, and process 500 loops back to begin again and processes new frames. In at least one embodiment, a message indicating that no anomaly detected and images are free of anomaly events is generated. In at least one embodiment, process 500 is a recursive process until all images or video data has been processed through neural network.

As an example to describe process of FIG. 5, video data is obtained from traffic cameras. In at least one embodiment, a convolutional autoencoder is used to make inferences about objects in images/frames (e.g., a car is shown in several frames). In at least one embodiment, LSTM then uses results from convolutional autoencoder to make inferences about what those objects are doing from frame-to-frame (e.g., car is travelling in a particular lane/direction). In at least one embodiment, probabilistic model (e.g., GMM) indicates whether objects are being anomalous. In at least one embodiment, if a car is travelling in a wrong direction, GMM would indicate an anomaly because, from being trained, it would learn that cars travel in opposite direction. In at least one embodiment, if a car is stuck in an intersection for a specific period of time, GMM would indicate an anomaly because, from being trained, it would learn that cars don't stay in an intersection for longer than ten seconds. As indicated above, in at least one embodiment, speech data or text data instead of video data is used to identify anomalous speech or text.

Figure 6:
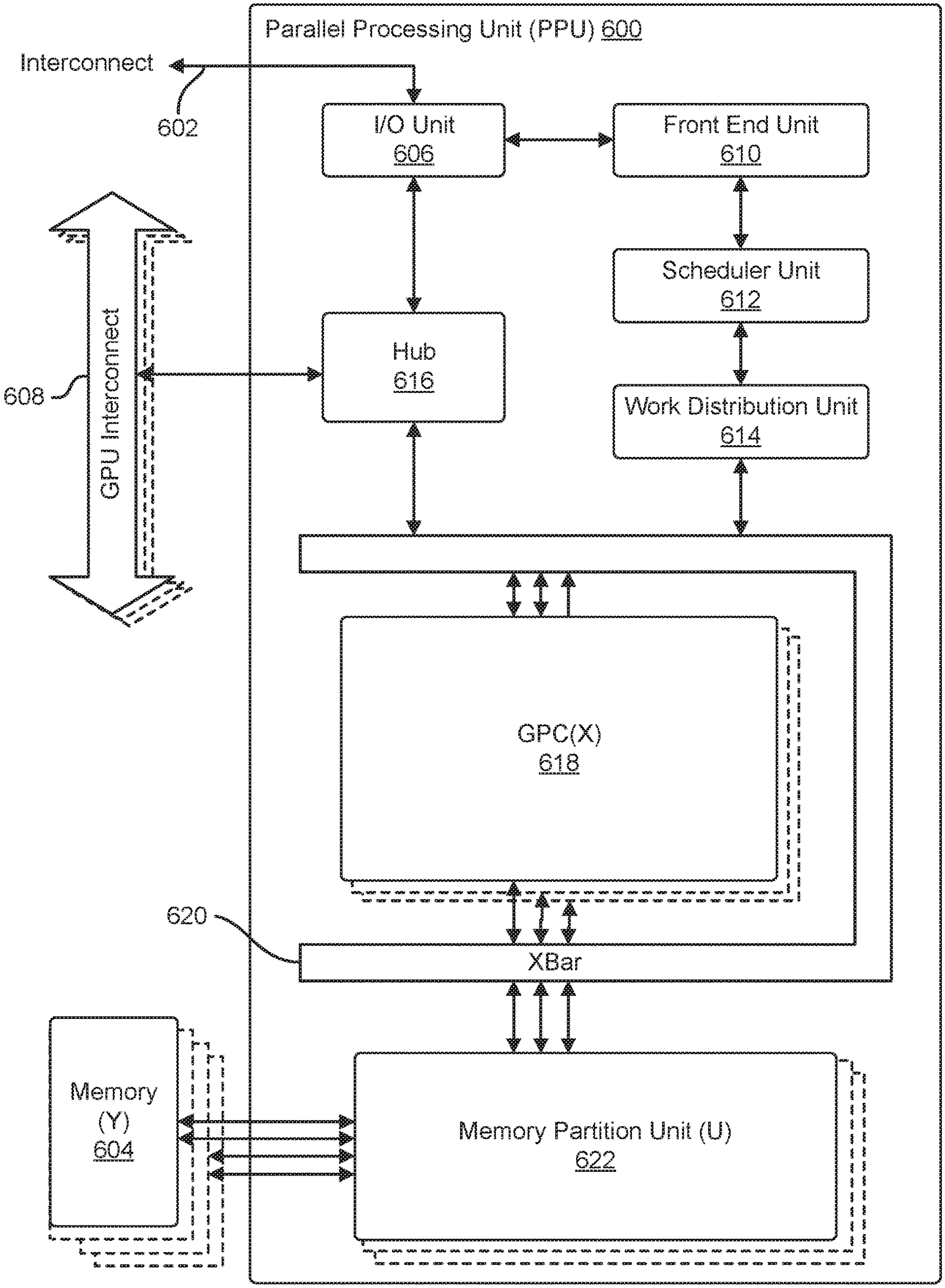
FIG. 6 illustrates an example of parallel processing unit ("PPU"), in accordance with an embodiment.

FIG. 6 illustrates a parallel processing unit ("PPU") 600, in accordance with one embodiment. In at least one embodiment, PPU 600 is configured with machine-readable code that, if executed by PPU, causes PPU to perform some or all of processes and techniques described throughout this disclosure. In at least one embodiment, PPU 600 is a multithreaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 600. In at least one embodiment, PPU 600 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In at least one embodiment, PPU 600 is utilized to perform computations such as linear algebra operations and machine-learning operations. FIG. 5 illustrates an example parallel processor for illustrative purposes only and should be construed as a non-limiting example of processor architectures contemplated within a scope of this disclosure and that any suitable processor may be employed to supplement and/or substitute.

In at least one embodiment, one or more PPUs are configured to accelerate High Performance Computing ("HPC"), data center, and machine learning applications. In at least one embodiment, PPU 600 is configured to accelerate deep learning systems and applications including a following of non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 600 includes an Input/Output ("I/O") unit 606, a front-end unit 610, a scheduler unit 612, a work distribution unit 614, a hub 616, a crossbar ("Xbar") 620, one or more general processing clusters ("GPCs") 618, and one or more partition units 622. In at least one embodiment, PPU 600 is connected to a host processor or other PPUs 600 via one or more high-speed GPU interconnects 608. In at least one embodiment, PPU 600 is connected to a host processor or other peripheral devices via an interconnect 602. In at least one embodiment, PPU 600 is connected to a local memory comprising one or more memory devices 604. In at least one embodiment, local memory comprises one or more dynamic random access memory ("DRAM") devices. In at least one embodiment, one or more DRAM devices are configured and/or configurable as high-bandwidth memory ("HBM") subsystems, with multiple DRAM dies stacked within each device.

High-speed GPU interconnect 608 may refer to a wire-based multi-lane communications link that is used by systems to scale and include one or more PPUs 600 combined with one or more CPUs, supports cache coherence between PPUs 600 and CPUs, and CPU mastering. In at least one embodiment, data and/or commands are transmitted by high-speed GPU interconnect 608 through hub 616 to/from other units of PPU 600 such as one or more copy engines, video encoders, video decoders, power management units, and other components which may not be explicitly illustrated in FIG. 5.

In at least one embodiment, I/O unit 606 is configured to transmit and receive communications (e.g., commands, data) from a host processor (not illustrated in FIG. 5) over system bus 602. In at least one embodiment, I/O unit 606 communicates with host processor directly via system bus 602 or through one or more intermediate devices such as a memory bridge. In at least one embodiment, I/O unit 606 may communicate with one or more other processors, such as one or more of PPUs 600 via system bus 602. In at least one embodiment, I/O unit 606 implements a Peripheral Component Interconnect Express ("PCIe") interface for communications over a PCIe bus. In at least one embodiment, I/O unit 606 implements interfaces for communicating with external devices.

In at least one embodiment, I/O unit 606 decodes packets received via system bus 602. In at least one embodiment, at least some packets represent commands configured to cause PPU 600 to perform various operations. In at least one embodiment, I/O unit 606 transmits decoded commands to various other units of PPU 600 as specified by commands. In at least one embodiment, commands are transmitted to front-end unit 610 and/or transmitted to hub 616 or other units of PPU 600 such as one or more copy engines, a video encoder, a video decoder, a power management unit, etc. (not explicitly illustrated in FIG. 5). In at least one embodiment, I/O unit 606 is configured to route communications between and among various logical units of PPU 600.

In at least one embodiment, a program executed by host processor encodes a command stream in a buffer that provides workloads to PPU 600 for processing. In at least one embodiment, a workload comprises instructions and data to be processed by those instructions. In at least one embodiment, buffer is a region in a memory that is accessible (e.g., read/write) by both host processor and PPU 600—host interface unit may be configured to access buffer in a system memory connected to system bus 602 via memory requests transmitted over system bus 602 by I/O unit 606. In at least one embodiment, host processor writes command stream to buffer and then transmits a pointer to start of command stream to PPU 600 such that front-end unit 610 receives pointers to one or more command streams and manages one or more streams, reading commands from streams and forwarding commands to various units of PPU 600.

In at least one embodiment, front-end unit 610 is coupled to a scheduler unit 612 that configures various GPCs 618 to process tasks defined by one or more streams. In at least one embodiment, scheduler unit 612 is configured to track state information related to various tasks managed by scheduler unit 612 where state information may indicate which GPC 618 a task is assigned to, whether a task is active or inactive, a priority level associated with task, and so forth. In at least one embodiment, scheduler unit 612 manages execution of a plurality of tasks on one or more GPCs 618.

In at least one embodiment, scheduler unit 612 is coupled to a work distribution unit 614 that is configured to dispatch tasks for execution on GPCs 618. In at least one embodiment, work distribution unit 614 tracks a number of scheduled tasks received from scheduler unit 612 and work distribution unit 614 manages a pending task pool and an active task pool for each of GPCs 618. In at least one embodiment, pending task pool comprises a number of slots (e.g., 32 slots) that contain tasks assigned to be processed by a particular GPC 618; active task pool may comprise a number of slots (e.g., 4 slots) for tasks that are actively being processed by GPCs 618 such that as a GPC 618 completes execution of a task, that task is evicted from active task pool for GPC 618 and one of other tasks from pending task pool is selected and scheduled for execution on GPC 618. In at least one embodiment, if an active task is idle on GPC 618, such as while waiting for a data dependency to be resolved, then active task is evicted from GPC 618 and returned to pending task pool while another task in pending task pool is selected and scheduled for execution on GPC 618.

In at least one embodiment, work distribution unit 614 communicates with one or more GPCs 618 via XBar 620. In at least one embodiment, XBar 620 is an interconnect network that couples many of units of PPU 600 to other units of PPU 600 and can be configured to couple work distribution unit 614 to a particular GPC 618. Although not shown explicitly, one or more other units of PPU 600 may also be connected to XBar 620 via hub 616.

Tasks are managed by scheduler unit 612 and dispatched to a GPC 618 by work distribution unit 614. GPC 618 is configured to process task and generate results. Results may be consumed by other tasks within GPC 618, routed to a different GPC 618 via XBar 620, or stored in memory 604. Results can be written to memory 604 via partition units 622, which implement a memory interface for reading and writing data to/from memory 604. Results can be transmitted to another PPU 604 or CPU via high-speed GPU interconnect 608. In at least one embodiment, PPU 600 includes a number of partition units 622 that is equal to number of separate and distinct memory devices 604 coupled to PPU 600. A partition unit 622 will be described in more detail below in conjunction with FIG. 7.

In at least one embodiment, a host processor executes a driver kernel that implements an application programming interface ("API") that enables one or more applications executing on host processor to schedule operations for execution on PPU 600. In at least one embodiment, multiple compute applications are simultaneously executed by PPU 600 and PPU 600 provides isolation, quality of service ("QoS"), and independent address spaces for multiple compute applications. In at least one embodiment, an application generates instructions (e.g., in form of API calls) that cause driver kernel to generate one or more tasks for execution by PPU 600 and driver kernel outputs tasks to one or more streams being processed by PPU 600. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory. Threads and cooperating threads are described in more detail, in accordance with one embodiment, in conjunction with FIG. 7A.

Figure 7:
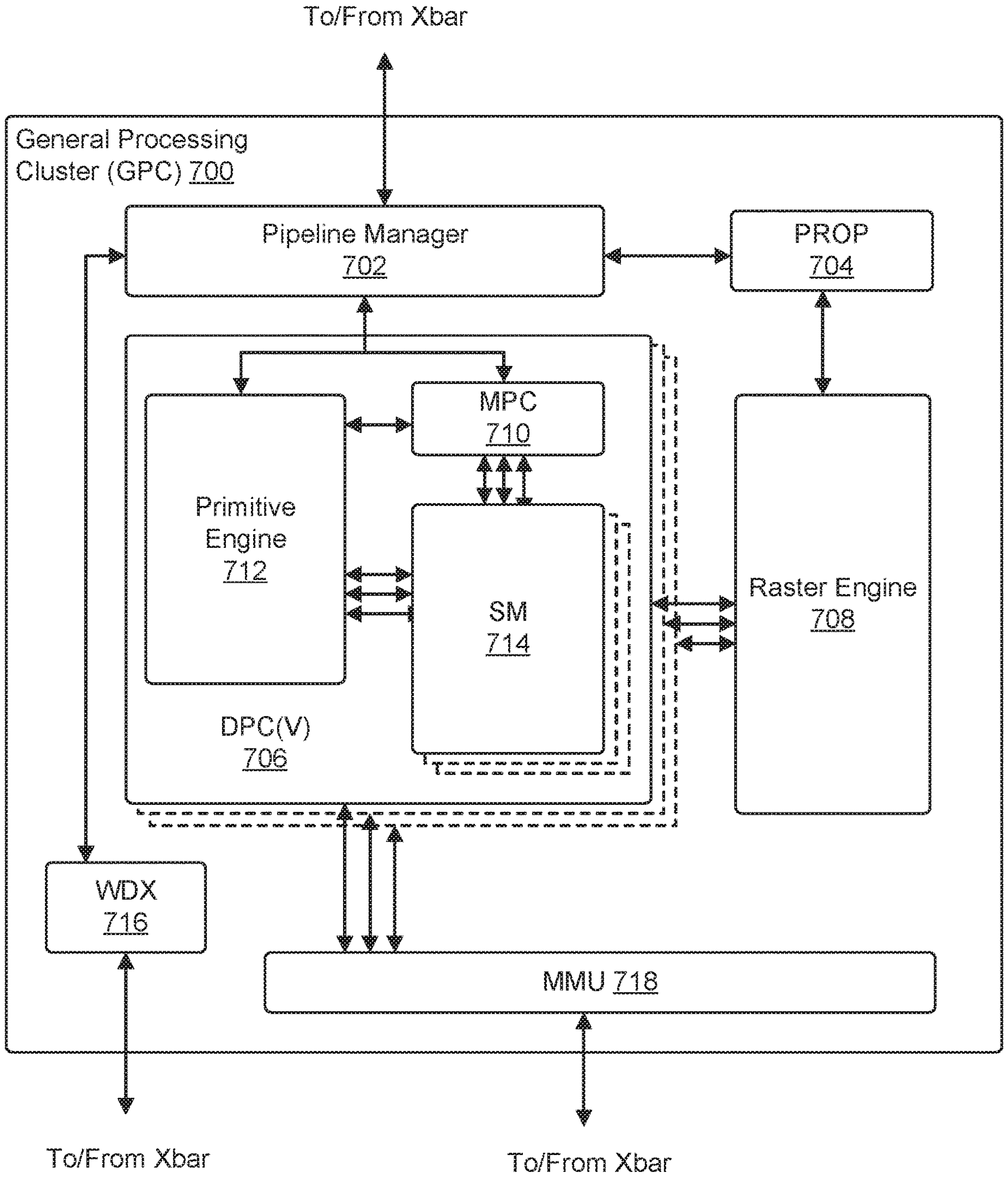
FIG. 7 illustrates an example of a general processing cluster ("GPC"), in accordance with one embodiment.

FIG. 7 illustrates a GPC 700 such as GPC illustrated of PPU 600 of FIG. 6, in accordance with one embodiment. In at least one embodiment, each GPC 700 includes a number of hardware units for processing tasks and each GPC 700 includes a pipeline manager 702, a pre-raster operations unit ("PROP") 704, a raster engine 708, a work distribution crossbar ("WDX") 716, a memory management unit ("MMU") 718, one or more Data Processing Clusters ("DPCs") 706, and any suitable combination of parts. It will be appreciated that GPC 700 of FIG. 6 may include other hardware units in lieu of or in addition to units shown in FIG. 7.

In at least one embodiment, operation of GPC 700 is controlled by pipeline manager 702. Pipeline manager 702 manages configuration of one or more DPCs 706 for processing tasks allocated to GPC 700. In at least one embodiment, pipeline manager 702 configures at least one of one or more DPCs 706 to implement at least a portion of a graphics rendering pipeline. In at least one embodiment, a DPC 706 is configured to execute a vertex shader program on programmable streaming multiprocessor ("SM") 714. Pipeline manager 702 is configured to route packets received from a work distribution to appropriate logical units within GPC 700, in at least one embodiment, and some packets may be routed to fixed function hardware units in PROP 704 and/or raster engine 708 while other packets may be routed to DPCs 706 for processing by primitive engine 712 or SM 714. In at least one embodiment, pipeline manager 702 configures at least one of one or more DPCs 706 to implement a neural network model and/or a computing pipeline.

PROP unit 704 is configured, in at least one embodiment, to route data generated by raster engine 708 and DPCs 706 to a Raster Operations ("ROP") unit in memory partition unit, described in more detail above. In at least one embodiment, PROP unit 704 is configured to perform optimizations for color blending, organize pixel data, perform address translations, and more. raster engine 708 includes a number of fixed function hardware units configured to perform various raster operations, in at least one embodiment, and raster engine 708 includes a setup engine, a coarse raster engine, a culling engine, a clipping engine, a fine raster engine, a tile coalescing engine, and any suitable combination thereof. A setup engine, in at least one embodiment, receives transformed vertices and generates plane equations associated with geometric primitive defined by vertices; plane equations are transmitted to a coarse raster engine to generate coverage information (e.g., an x, y coverage mask for a tile) for a primitive; an output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by setup engine. In at least one embodiment, output of raster engine 708 comprises fragments to be processed by any suitable entity such as by a fragment shader implemented within a DPC 706.

In at least one embodiment, each DPC 706 included in GPC 700 comprises an M-Pipe Controller ("MPC") 710; a primitive engine 712; one or more SMs 714; and any suitable combination thereof. In at least one embodiment, MPC 710 controls operation of DPC 706, routing packets received from pipeline manager 702 to appropriate units in DPC 706. In at least one embodiment, packets associated with a vertex are routed to primitive engine 712, which is configured to fetch vertex attributes associated with vertex from memory; in contrast, packets associated with a shader program may be transmitted to SM 714.

In at least one embodiment, SM 714 comprises a programmable streaming processor that is configured to process tasks represented by a number of threads. In at least one embodiment, SM 714 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on same set of instructions. In at least one embodiment, all threads in group of threads execute same instructions. In at least one embodiment, SM 714 implements a SIMT (Single-Instruction, Multiple Thread) architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. In at least one embodiment, SM 714 is described in more detail below.

In at least one embodiment, MMU 718 provides an interface between GPC 700 and memory partition unit and MMU 718 provides translation of virtual addresses into physical addresses, memory protection, and arbitration of memory requests. In at least one embodiment, MMU 718 provides one or more translation lookaside buffers ("TLBs") for performing translation of virtual addresses into physical addresses in memory.

Figure 8:
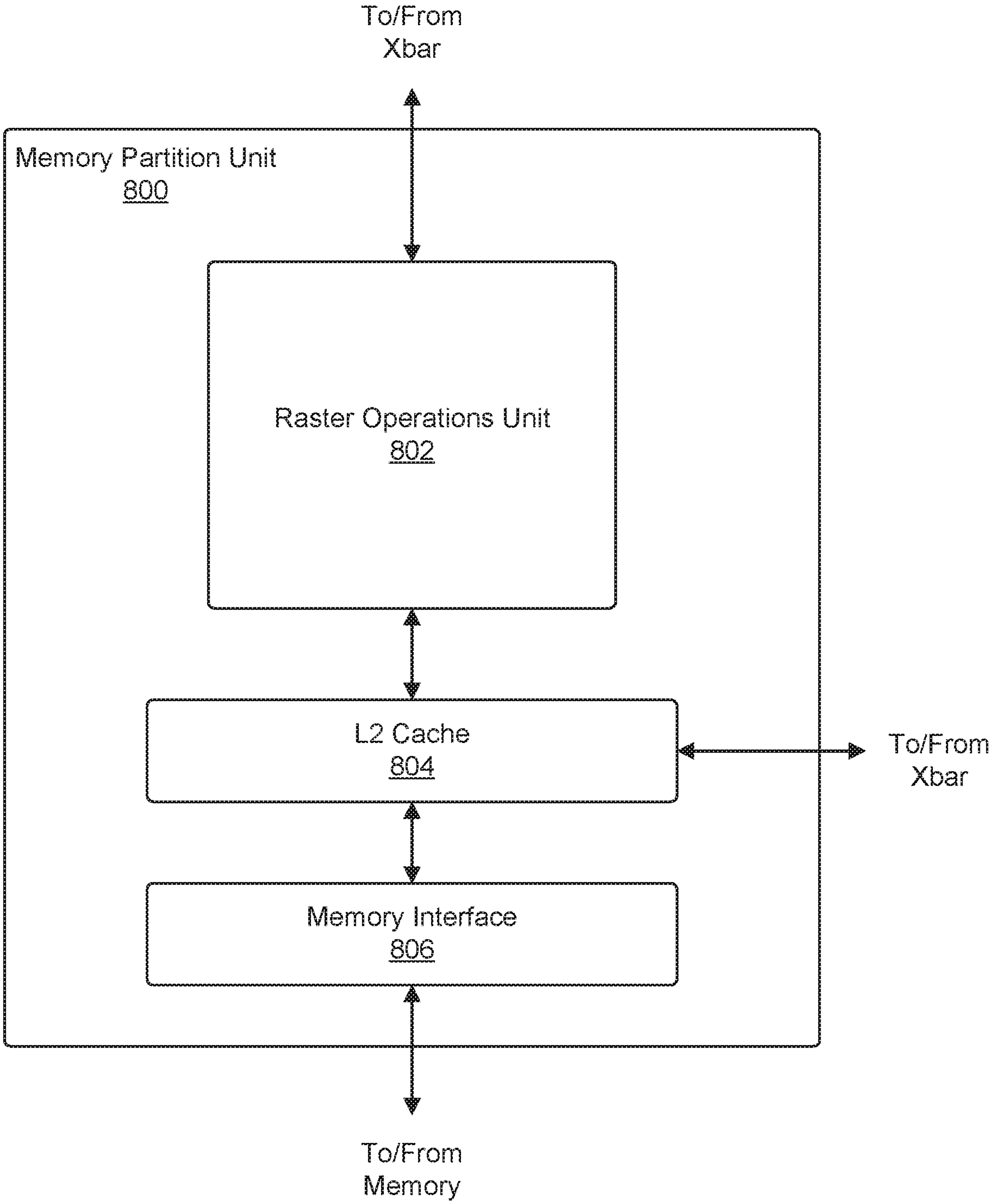
FIG. 8 illustrates an example of a memory partition unit, in accordance with one embodiment.

FIG. 8 illustrates a memory partition unit of a PPU, in accordance with one embodiment. In at least one embodiment, memory partition unit 800 includes a Raster Operations ("ROP") unit 802; a level two ("L2") cache 804; a memory interface 806; and any suitable combination thereof. Memory interface 806 is coupled to memory. Memory interface 806 may implement 32, 64, 128, 1024-bit data buses, or like, for high-speed data transfer. In at least one embodiment, PPU incorporates U memory interfaces 806, one memory interface 806 per pair of partition units 800, where each pair of partition units 800 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In at least one embodiment, memory interface 806 implements an HBM2 memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes four memory dies and Y equals 4, with HBM2 stack including two 128-bit channels per die for a total of 8 channels and a data bus width of 1024 bits.

In at least one embodiment, memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In at least one embodiment, PPU implements a multi-level memory hierarchy. In at least one embodiment, memory partition unit 800 supports a unified memory to provide a single unified virtual address space for CPU and PPU memory, enabling data sharing between virtual memory systems. In at least one embodiment frequency of accesses by a PPU to memory located on other processors is trace to ensure that memory pages are moved to physical memory of PPU that is accessing pages more frequently. In at least one embodiment, high-speed GPU interconnect 608 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 800 then services page faults, mapping addresses into page table, after which copy engine performs transfer. In at least one embodiment, memory is pinned (e.g., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory of FIG. 6 or other system memory is fetched by memory partition unit 800 and stored in L2 cache 804, which is located on-chip and is shared between various GPCs, in accordance with one embodiment. Each memory partition unit 800, in at least one embodiment, includes at least a portion of L2 cache 760 associated with a corresponding memory device. In at least one embodiment, lower level caches are implemented in various units within GPCs. In at least one embodiment, each of SMs 840 may implement a level one ("L1") cache wherein L1 cache is private memory that is dedicated to a particular SM 840 and data from L2 cache 804 is fetched and stored in each of L1 caches for processing in functional units of SMs 840. In at least one embodiment, L2 cache 804 is coupled to memory interface 806 and XBar 620.

ROP unit 802 performs graphics raster operations related to pixel color, such as color compression, pixel blending, and more, in at least one embodiment. ROP unit 850, in at least one embodiment, implements depth testing in conjunction with raster engine 825, receiving a depth for a sample location associated with a pixel fragment from culling engine of raster engine 825. In at least one embodiment, depth is tested against a corresponding depth in a depth buffer for a sample location associated with fragment. In at least one embodiment, if fragment passes depth test for sample location, then ROP unit 802 updates depth buffer and transmits a result of depth test to raster engine 825. It will be appreciated that number of partition units 800 may be different than number of GPCs and, therefore, each ROP unit 802 can, in at least one embodiment, be coupled to each of GPCs. In at least one embodiment, ROP unit 802 tracks packets received from different GPCs and determines which that a result generated by ROP unit 802 is routed to through XBar.

Figure 9:
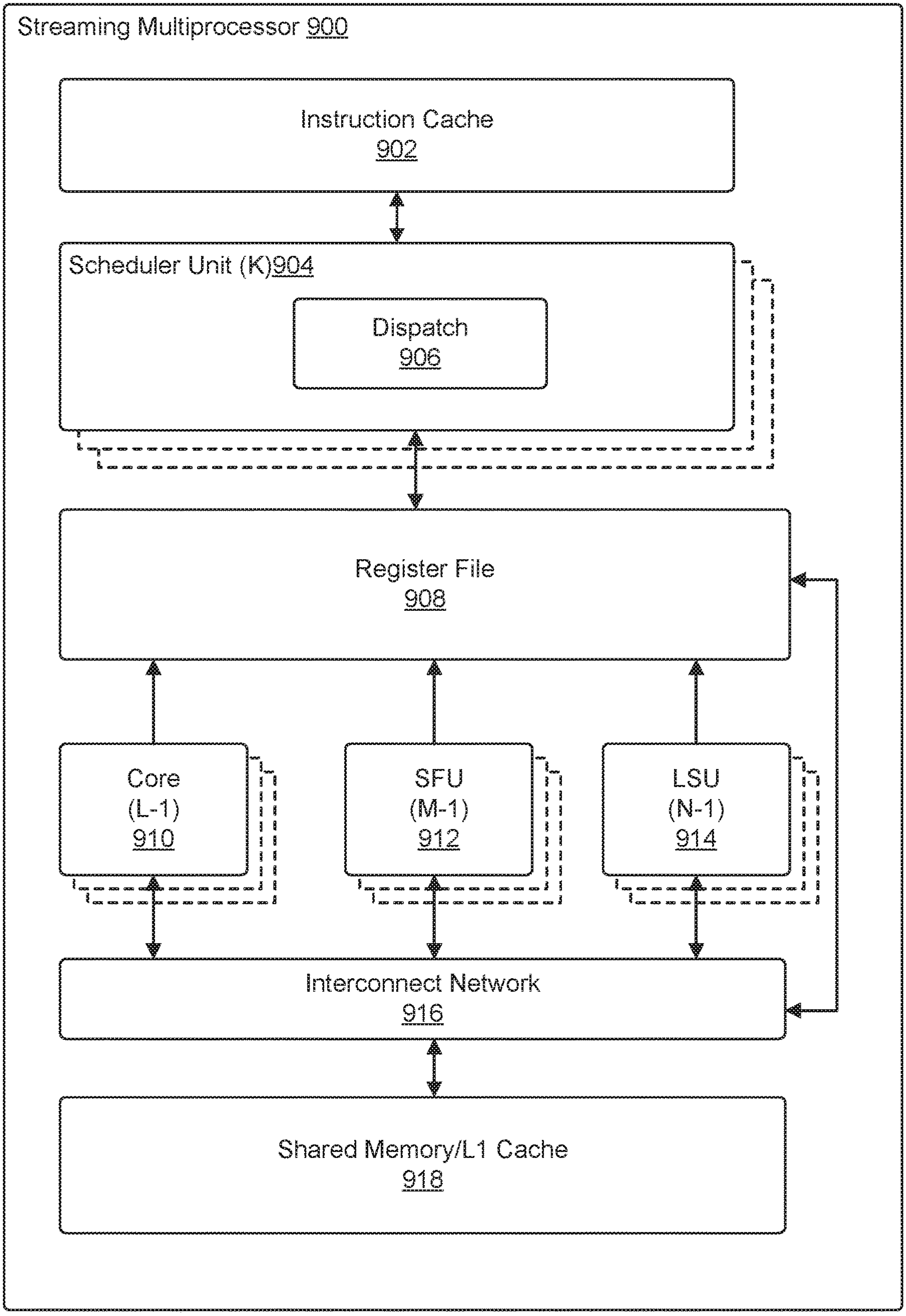
FIG. 9 illustrates an example of a streaming multi-processor, in accordance with one embodiment.

FIG. 9 illustrates a streaming multi-processor such as streaming multi-processor of FIG. 7, in accordance with one embodiment. In at least one embodiment, SM 900 includes: an instruction cache 902; one or more scheduler units 904; a register file 908; one or more processing cores 910; one or more special function units ("SFUs") 912; one or more load/store units ("LSUs") 914; an interconnect network 916; a shared memory/L1 cache 918; and any suitable combination thereof. In at least one embodiment, work distribution unit dispatches tasks for execution on GPCs of PPU and each task is allocated to a particular DPC within a GPC and, if task is associated with a shader program, task is allocated to an SM 900. In at least one embodiment, scheduler unit 904 receives tasks from work distribution unit and manages instruction scheduling for one or more thread blocks assigned to SM 900. In at least one embodiment, scheduler unit 904 schedules thread blocks for execution as warps of parallel threads, wherein each thread block is allocated at least one warp. In at least one embodiment, each warp executes threads. In at least one embodiment, scheduler unit 904 manages a plurality of different thread blocks, allocating warps to different thread blocks and then dispatching instructions from plurality of different cooperative groups to various functional units (e.g., cores 910, SFUs 912, and LSUs 914) during each clock cycle.

Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, programmers would often like to define groups of threads at smaller than thread block granularities and synchronize within defined groups to enable greater performance, design flexibility, and software reuse in form of collective group-wide function interfaces. Cooperative Groups enables programmers to define groups of threads explicitly at sub-block (e.g., as small as a single thread) and multi-block granularities, and to perform collective operations such as synchronization on threads in a cooperative group. programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In at least one embodiment, a dispatch unit 906 is configured to transmit instructions to one or more of functional units and scheduler unit 904 includes two dispatch units 906 that enable two different instructions from same warp to be dispatched during each clock cycle. In at least one embodiment, each scheduler unit 904 includes a single dispatch unit 906 or additional dispatch units 906.

Each SM 900, in at least one embodiment, includes a register file 908 that provides a set of registers for functional units of SM 900. In at least one embodiment, register file 908 is divided between each of functional units such that each functional unit is allocated a dedicated portion of register file 908. In at least one embodiment, register file 908 is divided between different warps being executed by SM 900 and register file 908 provides temporary storage for operands connected to data paths of functional units. In at least one embodiment, each SM 900 comprises a plurality of L processing cores 910. In at least one embodiment, SM 900 includes a large number (e.g., 128 or more) of distinct processing cores 910. Each core 910, in at least one embodiment, includes a fully-pipelined, single-precision, double-precision, and/or mixed precision processing unit that includes a floating point arithmetic logic unit and an integer arithmetic logic unit. In at least one embodiment, floating point arithmetic logic units implement IEEE 754-2008 standard for floating point arithmetic. In at least one embodiment, cores 910 include 64 single-precision (32-bit) floating point cores, 64 integer cores, 32 double-precision (64-bit) floating point cores, and 8 tensor cores.

Tensor cores are configured to perform matrix operations in accordance with an embodiment. In at least one embodiment, one or more tensor cores are included in cores 910. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply requires 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 900 comprises M SFUs 912 that perform special functions (e.g., attribute evaluation, reciprocal square root, and like). In at least one embodiment, SFUs 912 include a tree traversal unit configured to traverse a hierarchical tree data structure. In at least one embodiment, SFUs 912 include texture unit configured to perform texture map filtering operations. In at least one embodiment, texture units are configured to load texture maps (e.g., a 2D array of texels) from memory and sample texture maps to produce sampled texture values for use in shader programs executed by SM 900. In at least one embodiment, texture maps are stored in shared memory/L1 cache. texture units implement texture operations such as filtering operations using mip-maps (e.g., texture maps of varying levels of detail), in accordance with one embodiment. In at least one embodiment, each SM 900 includes two texture units.

Each SM 900 comprises N LSUs 854 that implement load and store operations between shared memory/L1 cache 806 and register file 908, in at least one embodiment. Each SM 900 includes an interconnect network 816 that connects each of functional units to register file 908 and LSU 914 to register file 908, shared memory/L1 cache 918 in at least one embodiment. In at least one embodiment, interconnect network 916 is a crossbar that can be configured to connect any of functional units to any of registers in register file 908 and connect LSUs 914 to register file and memory locations in shared memory/L1 cache 918.

Shared memory/L1 cache 918 is an array of on-chip memory that allows for data storage and communication between SM 900 and primitive engine and between threads in SM 900 in at least one embodiment. In at least one embodiment, shared memory/L1 cache 918 comprises 128 KB of storage capacity and is in path from SM 900 to partition unit. shared memory/L1 cache 918, in at least one embodiment, is used to cache reads and writes. One or more of shared memory/L1 cache 918, L2 cache, and memory are backing stores.

Combining data cache and shared memory functionality into a single memory block provides improved performance for both types of memory accesses, in at least one embodiment. capacity, in at least one embodiment, is used or is usable as a cache by programs that do not use shared memory, such as if shared memory is configured to use half of capacity, texture and load/store operations can use remaining capacity. Integration within shared memory/L1 cache 918 enables shared memory/L1 cache 918 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In at least one embodiment, fixed function graphics processing units are bypassed, creating a much simpler programming model. In general purpose parallel computation configuration, work distrubution unit assigns and distributes blocks of threads directly to DPCs, in at least one embodiment. threads in a block execute same program, using a unique thread ID in calculation to ensure each thread generates unique results, using SM 900 to execute program and perform calculations, shared memory/L1 cache 918 to communicate between threads, and LSU 914 to read and write global memory through shared memory/L1 cache 918 and memory partition unit, in accordance with one embodiment. In at least one embodiment, when configured for general purpose parallel computation, SM 900 writes commands that scheduler unit can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. graphics card may be configured to interface with a PCIe slot on a motherboard of a desktop computer. In yet another embodiment, PPU may be an integrate graphics processing unit ("iGPU") included in chipset of motherboard.

Figure 10:
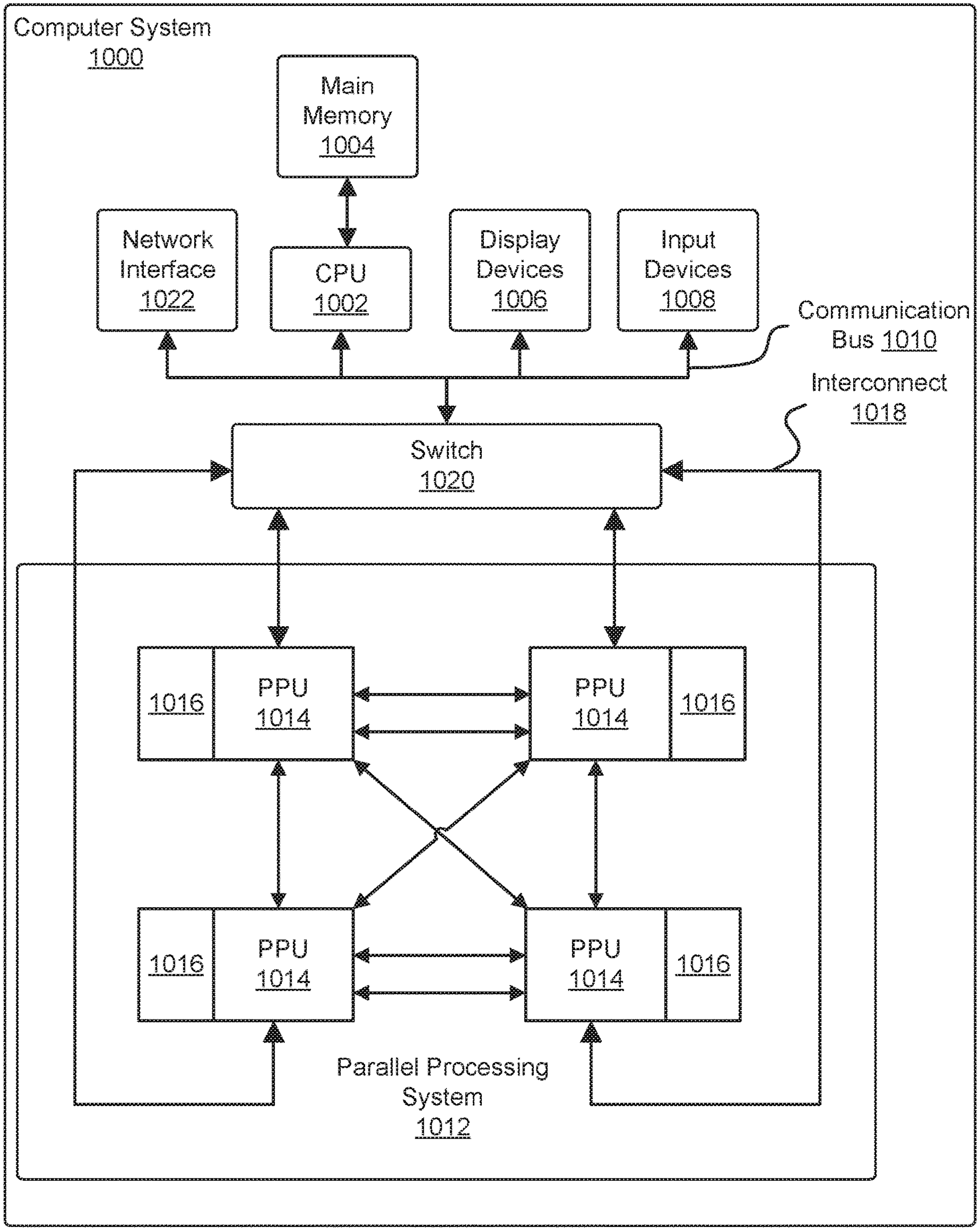
FIG. 10 illustrates a computer system in which various examples can be implemented, in accordance with one embodiment.

FIG. 10 illustrates a computer system 1000 in which various architecture and/or functionality can be implemented, in accordance with one embodiment. computer system 1000, in at least one embodiment, is configured to implement various processes and methods described throughout this disclosure.

In at least one embodiment, computer system 1000 comprises at least one central processing unit 1002 that is connected to a communication bus 1010 implemented using any suitable protocol, such as PCI (Peripheral Component Interconnect), PCI-Express, AGP (Accelerated Graphics Port), HyperTransport, or any other bus or point-to-point communication protocol(s). In at least one embodiment, computer system 1000 includes a main memory 1004 and control logic (e.g., implemented as hardware, software, or a combination thereof) and data are stored in main memory 1004 which may take form of random access memory ("RAM"). In at least one embodiment, a network interface subsystem 1022 provides an interface to other computing devices and networks for receiving data from and transmitting data to other systems from computer system 1000.

Computer system 1000, in at least one embodiment, includes input devices 1008, parallel processing system 1012, and display devices 1006 which can be implemented using a conventional CRT (cathode ray tube), LCD (liquid crystal display), LED (light emitting diode), plasma display, or other suitable display technologies. In at least one embodiment, user input is received from input devices 1008 such as keyboard, mouse, touchpad, microphone, and more. In at least one embodiment, each of foregoing modules can be situated on a single semiconductor platform to form a processing system.

In present description, a single semiconductor platform may refer to a sole unitary semiconductor-based integrated circuit or chip. It should be noted that term single semiconductor platform may also refer to multi-chip modules with increased connectivity which simulate on-chip operation, and make substantial improvements over utilizing a conventional central processing unit ("CPU") and bus implementation. Of course, various modules may also be situated separately or in various combinations of semiconductor platforms per desires of user.

In at least one embodiment, computer programs in form of machine-readable executable code or computer control logic algorithms are stored in main memory 1004 and/or secondary storage. Computer programs, if executed by one or more processors, enable system 1000 to perform various functions in accordance with one embodiment. Memory 1004, storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In at least one embodiment, architecture and/or functionality of various previous figures are implemented in context of central processor 1002; parallel processing system 1012; an integrated circuit capable of at least a portion of capabilities of both central processor 1002; parallel processing system 1012; a chipset (e.g., a group of integrated circuits designed to work and sold as a unit for performing related functions, etc.); and any suitable combination of integrated circuit.

In at least one embodiment, architecture and/or functionality of various previous figures is be implemented in context of a general computer system, a circuit board system, a game console system dedicated for entertainment purposes, an application-specific system, and more. In at least one embodiment, computer system 1000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, a parallel processing system 1012 includes a plurality of PPUs 1014 and associated memories 1016. In at least one embodiment, PPUs are connected to a host processor or other peripheral devices via an interconnect 1018 and a switch 1020 or multiplexer. In at least one embodiment, parallel processing system 1012 distributes computational tasks across PPUs 1014 which can be parallelizable—for example, as part of distribution of computational tasks across multiple GPU thread blocks. In at least one embodiment, memory is shared and accessible (e.g., for read and/or write access) across some or all of PPUs 1014, although such shared memory may incur performance penalties relative to use of local memory and registers resident to a PPU. In at least one embodiment, operation of PPUs 1014 is synchronized through use of a command such as _syncthreads( ) which requires all threads in a block (e.g., executed across multiple PPUs 1014) to reach a certain point of execution of code before proceeding.

Specification and drawings are, accordingly, to be regarded in an illustrative rather than a restrictive sense. It will, however, be evident that various modifications and changes may be made thereunto without departing from broader spirit and scope of invention as set forth in claims.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit invention to specific form or forms disclosed, but on contrary, intention is to cover all modifications, alternative constructions, and equivalents falling within spirit and scope of invention, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context. terms "comprising," "having," "including," and "containing" are to be construed as open-ended terms (e.g., meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main CPU execute some of instructions while a graphics processor unit executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implement an embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of invention and does not pose a limitation on scope of invention unless otherwise claimed. No language in specification should be construed as indicating any non-claimed element as essential to practice of invention.

Embodiments of this disclosure are described herein, including best mode known to inventors for carrying out invention. Variations of those embodiments may become apparent to those of ordinary skill in art upon reading foregoing description. inventors expect skilled artisans to employ such variations as appropriate and inventors intend for embodiments of present disclosure to be practiced otherwise than as specifically described herein. Accordingly, scope of present disclosure includes all modifications and equivalents of subject matter recited in claims appended hereto as permitted by applicable law. Moreover, any combination of above-described elements in all possible variations thereof is encompassed by scope of present disclosure unless otherwise indicated herein or otherwise clearly contradicted by context.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter defined in appended claims is not necessarily limited to specific features or acts described. Rather, specific features and acts are disclosed as exemplary forms of implementing claims.

What is claimed is:

1. One or more processors, comprising:

circuitry to:

train an autoencoder to encode, in a latent space, spatial content from individual images in a sequence of images;

train a long short-term memory (LSTM) using the encoded spatial content to infer one or more temporal changes in the sequence of images based, at least in part, on differences among previous images with newly incoming images from the sequence of images; and train a probabilistic model to produce a likelihood score that the one or more temporal changes are anomalous based, at least in part, on a first received input to the probabilistic model from the LSTM comprising the one or more temporal changes and a second received input to the probabilistic model comprising one or more reconstruction errors associated with the sequence of images.

2. The one or more processors of claim 1, wherein the probabilistic model is to output the likelihood score that the one or more temporal changes associated with newly incoming images are anomalous compared to the previous images in the sequence of images.

3. The one or more processors of claim 1, wherein the circuitry is to train the autoencoder with an internal layer that maps the sequence of images to generate one or more latent representations in a feature space.

4. The one or more processors of claim 1, wherein the circuitry is to use 3-D volumes of bounding boxes generated based, at least in part, spatial information in the sequence of images to indicate one or more objects and temporal information to track the bounding boxes over time to determine whether the one or more temporal changes are anomalous.

5. The one or more processors of claim 3, wherein the circuitry is to train the LSTM that receives the one or more latent representations from the autoencoder to infer the one or more temporal changes in the sequence of images over a period of time.

6. The one or more processors of claim 1, wherein the spatial content from the individual images in the sequence of images includes spatial information, and wherein the one or more temporal changes in the sequence of images includes temporal information associated with the spatial information.

7. The one or more processors of claim 1, wherein the one or more temporal changes include changes to a direction of motion of the spatial content.

8. The one or more processors of claim 1, wherein the circuitry is to receive the sequence of images from at least one or more stationary video cameras, wherein the one or more stationary video cameras provide the sequence of images for anomalous event detection without reconfigurations.

9. A system, comprising:

one or more computers having one or more processors to:

train an autoencoder to encode, in a latent space, spatial content from individual images in a sequence of images;

train a long short-term memory (LSTM) using the encoded spatial content to infer one or more temporal changes in the sequence of images based, at least in part, on differences among previous images with newly incoming images from the sequence of images; and train a probabilistic model to produce a likelihood score that the one or more temporal changes are anomalous based, at least in part, on a first received input to the probabilistic model from the LSTM comprising the one or more temporal changes and a second received input to the probabilistic model comprising one or more reconstruction errors associated with the sequence of images.

10. The system of claim 9, wherein the one or more processors are to:

input the sequence of images to the autoencoder to generate a first set of information representing the spatial content from the sequence of images;

input the first set of information to the LSTM to generate a second set of information associated with the one or more temporal changes in the sequence of images; and reproduce the sequence of images using the first set of information, wherein the one or more reconstruction errors are associated with the reproduced sequence of images.

11. The system of claim 10, wherein the autoencoder comprises a convolutional autoencoder that takes the sequence of images as input to generate the first set of information.

12. The system of claim 11, wherein the convolutional autoencoder maps features of the sequence of images to generate the first set of information in a reduced feature space from which the sequence of images can be approximately reproduced from the first set of information in the reduced feature space.

13. The system of claim 9, wherein the probabilistic model is to indicate whether the one or more temporal changes are anomalous if one or more patterns are present in the newly incoming images for a period of time that is indicative of an anomalous event as compared to normal behavior associated with the previous images.

14. The system of claim 10, wherein the one or more processors are to obtain the sequence of images from one or more static video cameras to detect anomalous events in the sequence of images.

15. The system of claim 10, wherein the probabilistic model is to be used to generate at least one indicator of an anomaly event in the sequence of images.

16. The system of claim 9, wherein an anomaly is detected based, at least in part, on the one or more temporal changes occurring over a duration greater than a threshold percentage of a duration of a ground truth event.

17. A machine-readable medium having stored thereon a set of instructions, which if performed by one or more processors, cause the one or more processors to:

train an autoencoder to encode, in a latent space, spatial content from individual images in a sequence of images;

train a long short-term memory (LSTM) using the encoded spatial content to infer one or more temporal changes in the sequence of images based, at least in part, on differences among previous images with newly incoming images from the sequence of images; and train a probabilistic model to produce a likelihood score that the one or more temporal changes are anomalous based, at least in part, on a first received input to the probabilistic model from the LSTM comprising the one or more temporal changes and a second received input to the probabilistic model comprising one or more reconstruction errors associated with the sequence of images.

18. The machine-readable medium of claim 17, wherein the set of instructions further cause the one or more processors to generate information associated with a likelihood of normal behavior in the sequence of images.

19. The machine-readable medium of claim 17, wherein the probabilistic model comprises a Gaussian Mixture Model (GMM).

20. The machine-readable medium of claim 19, wherein the GMM determines the likelihood score of one or more anomalous events associated with the one or more temporal changes.

21. A method comprising:

training an autoencoder to encode, in a latent space, spatial content from individual images in a sequence of images;

training a long short-term memory (LSTM) using the encoded spatial content to infer one or more temporal changes in the sequence of images based, at least in part, on differences among previous images with newly incoming images from the sequence of images; and training a probabilistic model to produce a likelihood score that the one or more temporal changes are anomalous based, at least in part, on a first received input to the probabilistic model from the LSTM comprising the one or more temporal changes and a second received input to the probabilistic model comprising one or more reconstruction errors associated with the sequence of images.

22. The method of claim 21, wherein the autoencoder comprises a convolutional autoencoder.

23. The method of claim 21, wherein the LSTM is to combine the newly incoming images with different sets of the previous images, where each of the different sets comprises a scaled amount of time captured by previous images.

24. The method of claim 21, wherein the spatial content from the individual images in the sequence of images includes one or more latent representations of the individual images, wherein the spatial content comprises motion of one or more objects in the one or more images.

25. The method of claim 24, wherein the probabilistic model comprises a Gaussian Mixture Model (GMM).

26. The method of claim 25, further comprising determining if the one or more temporal changes are anomalous using a threshold number of the sequence of images in which a change to motion of one or more objects in the sequence of images is detected.

* * * * *